(12) United States Patent
Fraser et al.

(10) Patent No.: US 7,387,167 B2
(45) Date of Patent: Jun. 17, 2008

(54) INSULATING DEVICE AND ASSEMBLY

(75) Inventors: Simon Benedict Fraser, Torphins (GB); William Brown-Kerr, Aboyne (GB); John Knight, Banchory (GB)

(73) Assignee: Maxwell Downhole Technology, Ltd (GB)

( * ) Notice: Subject to any disclaimer, the term of this patent is extended or adjusted under 35 U.S.C. 154(b) by 301 days.

(21) Appl. No.: 10/482,679

(22) PCT Filed: Jul. 1, 2002

(86) PCT No.: PCT/GB02/03020

§ 371 (c)(1),
(2), (4) Date: May 20, 2004

(87) PCT Pub. No.: WO03/004826

PCT Pub. Date: Jan. 16, 2003

(65) Prior Publication Data

US 2004/0206510 A1    Oct. 21, 2004

(30) Foreign Application Priority Data

Jun. 30, 2001    (GB)    ................................ 0116120.7

(51) Int. Cl.
*E21B 17/02*    (2006.01)
*F16L 55/00*    (2006.01)

(52) U.S. Cl. .................. 166/378; 166/242.1; 166/65.1; 285/53

(58) Field of Classification Search ................ 166/378, 166/242.1, 65.1; 411/178, 265; 285/47, 285/48, 53, 333, 334; 174/202, 204
See application file for complete search history.

(56) References Cited

U.S. PATENT DOCUMENTS

| 2,140,467 | A |   | 12/1938 | Cargile |
| 2,300,823 | A |   | 11/1942 | Whitman |
| 2,354,887 | A |   | 8/1944 | Silverman et al. |
| 2,917,704 | A | * | 12/1959 | Arps ........................... 324/352 |
| 3,778,089 | A | * | 12/1973 | Fredd .......................... 285/39 |
| 4,160,970 | A |   | 7/1979 | Nicolson |
| 4,496,174 | A | * | 1/1985 | McDonald et al. ........... 285/53 |
| 4,655,479 | A | * | 4/1987 | Farr, Jr. ....................... 285/18 |
| 4,674,773 | A |   | 6/1987 | Stone et al. |
| 4,691,203 | A |   | 9/1987 | Rubin et al. |
| 4,739,325 | A |   | 4/1988 | MacLeod |
| 4,818,167 | A | * | 4/1989 | Hatsutori .................... 411/386 |
| 4,861,074 | A | * | 8/1989 | Eastlund et al. .............. 285/53 |
| 5,058,683 | A |   | 10/1991 | Godfrey et al. |

(Continued)

FOREIGN PATENT DOCUMENTS

EP    0 940 557 AZ    9/1999

(Continued)

*Primary Examiner*—Kenneth Thompson
(74) *Attorney, Agent, or Firm*—Stephen M. Nipper; Dykas, Shaver & Nipper, LLP (57) ABSTRACT

There is disclosed an electrically insulating device in the form of a sleeve (12) for a downhole tool, for electrically insulating a first threaded electrically conductive member in the form of an anchor sub (16) from a second threaded electrically conductive member in the form of an insulated sub (18).

An assembly (10) including the sleeve (12) has particular use in measurement while drilling (MWD)/logging while drilling (LWD) procedures. In one embodiment, a third member in the form of a threaded electrically conductive sleeve sub (20) is coupled to the insulated sub by a second sleeve (14), to create an insulated gap between the anchor and sleeve subs (16, 20).

20 Claims, 5 Drawing Sheets

U.S. PATENT DOCUMENTS

| | | |
|---|---|---|
| 5,113,379 A | 5/1992 | Scherbatskoy |
| 5,130,706 A | 7/1992 | Van Steenwyk |
| 5,394,141 A | 2/1995 | Soulier |
| 5,406,983 A * | 4/1995 | Chambers et al. ........... 138/109 |
| 5,749,605 A * | 5/1998 | Hampton et al. ............. 285/48 |
| 5,883,516 A | 3/1999 | Van Steenwyk et al. |
| 6,098,727 A | 8/2000 | Ringgenberg et al. |
| 6,515,592 B1 * | 2/2003 | Babour et al. ........... 340/854.4 |

FOREIGN PATENT DOCUMENTS

| | | |
|---|---|---|
| EP | 0 964 134 A2 | 12/1999 |

* cited by examiner

INSULATING DEVICE AND ASSEMBLY

FIELD OF THE INVENTION

The present invention relates to an electrically insulating device for a downhole tool, an electrically insulated downhole assembly and to a method of electrically insulating a member of a downhole assembly. In particular, the present invention relates to an electrically insulating device for a downhole tool, for electrically insulating a first conductive member from a second conductive member of the tool.

BACKGROUND OF THE INVENTION

Measurement while drilling (MWD) techniques have been developed in the field of oil and gas well drilling to provide accurate information concerning operating conditions within an oil/gas borehole and to reduce rig down-time.

Various different approaches have been developed in this field. The first and simplest is a form of earth signalling, where a length of drill pipe is considered to be a "lossy" coaxial wire extending to surface. This method relies upon the earth having a finite resistance to support an electromagnetic field and consequently, this method is limited by the particular types of rock in which the borehole is drilled.

A second approach was developed using the drill pipe as a dipole aerial, treating the system as a very low frequency (VLF) radio system. Physical constraints, particularly the wavelength of the signal compared to the limited space in a borehole, impart severe practical difficulties in this approach.

In the 1970's, mud-pulse technology was developed, which enabled details of a wide variety of borehole conditions, such as depth, temperature and pressure to be transmitted to surface. However, this method has two significant limitations. Firstly, it relies upon a column of fluid and treating this fluid as having a limited compressibility, otherwise the signal is quickly "damped" to extinction. Secondly, the data transmission rate, even in relatively incompressible fluids is limited for any significant depth of borehole.

Over the last few years, MWD has extended to logging whilst drilling (LWD), where additional sensors are located at the bottom of a drill pipe, to measure parameters indicative of the rock type being drilled. This has created a need for higher data transmission rates, which cannot be met by mud-pulse telemetry.

The most significant change in the drilling industry in recent years has been the advent of air/foam replacing conventional drilling muds in drilling techniques. This technique has advantages in particular situations, for example, where the producing formation is fragile and over-pressure from "heavy" fluid columns can cause significant damage. Also, this can cause large volumes of the expensive drilling mud to be lost in the formation, which then has to be produced out of the well before oil/gas can be recovered.

Accordingly, there has been a return to the earth signalling approach where higher data transmission rates are obtainable. In this technique, an electromagnetic field is generated downhole in a drill string. This requires an insulated gap to be provided in the string. Current techniques include coating a sub with a thin coating of a ceramic material. This method is expensive, and the coating itself is costly, difficult to apply, and susceptible to damage, particularly on thread crests, when the sub is made-up to a tool/string. Also, the coating cannot be readily inspected for integrity, and cannot be refurbished or easily replaced.

It is amongst the objects of embodiments of the present invention to obviate or mitigate at least one of the foregoing disadvantages. In particular, it is amongst the objects of embodiments of the present invention to provide an electrically insulating device, an improved electrically insulated downhole assembly and a corresponding method which can be used in improved MWD techniques.

SUMMARY OF THE INVENTION

According to a first aspect of the present invention, there is provided an electrically insulating device for a downhole tool for electrically insulating a first threaded electrically conductive member from a second threaded electrically conductive member, the insulating device having first and second threads corresponding to the threads on the first and second electrically conductive members, respectively, for coupling the first and second electrically conductive members together.

The present invention is advantageous in that it provides a tough, separate insulating device which is easily disconnected from the first and second members to allow inspection, maintenance and ready replacement. This is in contrast with typical known systems where thin ceramic coatings are applied to threads of the first and second members, which are vulnerable to damage, cannot be easily inspected to ascertain whether there has been any deterioration in coating integrity, and cannot be replaced or refurbished; indeed, often a resin is applied to the coating to bond the threads together.

Preferably, the insulating device is for an electromagnetic measurement while drilling (EM-MWD) downhole tool. However, it will be understood that the device may equally be used in any other downhole situation where it is desired to provide an electrically insulated joint.

Preferably also, the electrically insulating device further comprises a threaded sleeve, the inner and outer surfaces of the sleeve defining the first and second threads of the device. The sleeve may comprise a tapered sleeve, and may include shoulders at opposite ends thereof, each shoulder adapted to abut the first and second members in use. Furthermore, each shoulder may further comprise first and second faces, each of the first and second faces disposed at an angle with respect to a radius of the sleeve. The first and second faces of each shoulder are preferably disposed at an angle of up to 5E either side of the radius. This is particularly advantageous in that the provision of such angled faces may cause the sleeve to experience enhanced compressive loading in use. Preferably also, the first and second threads of the insulating device are generally box shaped in cross-section, and the thread flanks may be substantially perpendicular to the thread axis. Reference to the threads being box shaped are to the threads being substantially square or rectangular in cross section. The thread angle between the thread flanks may be between 0E and 10E, and in particular is 10E. This is particularly advantageous in that, in use, the insulating device experiences compressive forces, and shear forces on the surfaces of the first and second threads of the device are reduced, thereby reducing the likelihood of damage. Preferably also, longitudinally adjacent inner and outer thread turns of the second member overlap in a radial direction. Thus, when the insulating device is made up to the first and second members, longitudinally adjacent thread turns on the first and second members overlap in a radial direction. This has the advantage that, in the unlikely event of failure of the insulating device, the threads on the first and second members overlap and engage, to prevent separation of the tool.

The electrically insulating device may be of a plastics material, preferably a modified Polyetheretherketone (PEEK), such as TECAPEEK GF30 (Trade Mark). Selection of a plastics material is advantageous in that the device can be easily manufactured, for example, through an injection moulding process. Selection of a PEEK material is further advantageous as such materials exhibit strength characteristics, particularly under compression, up to that of many metals/metal alloys employed in the downhole environment. Accordingly, structural integrity is not impaired. Also, PEEK resists corrosion by the various chemicals to which tools are exposed in the downhole environment.

According to a second aspect of the present invention, there is provided an electrically insulated downhole assembly comprising:

first, second and third threaded electrically conductive members adapted to be coupled together; and an electrically insulating assembly including a first electrically insulating device carrying first and second threads corresponding to the threads on the first and second electrically conductive members, for coupling the first and second electrically conductive members together, to electrically insulate the first threaded member from the third threaded member.

Preferably, the electrically insulating assembly further comprises a second electrically insulating device carrying first and second threads corresponding to the threads on the third and second members, for coupling the second and third electrically conductive members together. In air/foam drilling, the short gap provided by the use of a single insulating device may be sufficient for insulating the downhole assembly, due to the poor conductivity of the air/foam. However, with conventional drilling muds, first and second insulating devices may be required.

The assembly may be adapted to be run as part of an EM-MWD tool on a length of tubing, such as drill tubing or the like. The first and third members may comprise coupling subs for coupling the assembly to a length of tubing. Alternatively, the first and third members may form part of a tubing string. The second member may comprise a double pin (male) ended sub for coupling the first and third members together. Alternatively, the second member may comprise a double box (female) ended sub, or a sub with both pin and box connections at opposite ends thereof.

Preferably, the first and/or second electrically insulating devices comprise the device defined above with respect to the first aspect of the present invention.

Preferably also, the downhole assembly further comprises insulating means for insulating part of the second member to prevent short circuiting between the second member and the first and third members. The insulating means may comprise inner and outer insulating tubes mounted inside and around the second member, respectively. Conveniently, the inner and outer tubes comprise composite glass fibre-resin tubes, however, it will be appreciated that any other suitable insulating material, for example, plastics or other composites, may be chosen. This is advantageous as the tubes both insulate the second member, protect the second member against wear in use, for example, through contact with the borehole walls, and are readily replaceable. Alternatively or additionally, the insulating means may comprise an insulating coating applied to at least part of the inner and outer surfaces of a body of the second member. The insulating coating may comprise a ceramic based coating; ideally the coating is applied by, for example, a gun-detonation process to all of the second member except the threads.

The first and third members may include shoulders having angled faces to exert a compressive force upon the first and second insulating devices. The faces may be angled with respect to respective radii of the first and third members. The first and second insulating devices may include shoulders having cooperating angled faces. The faces of the shoulders on the first and third members may be at an angle of up to 5° with respect to respective radii of the members, and are preferably inclined towards the first and second insulating devices in use.

According to a third aspect of the present invention, there is provided an insulated sub assembly for a downhole tool, the sub assembly comprising:

an electrically conductive sub having threaded ends;

first and second electrically insulating devices coupled to the sub by first threads corresponding to threads on the sub, the devices including second threads adapted to couple the sub to tubing of the tool, for insulating the sub from a remainder of the tool.

Preferably, the sub assembly further comprises insulating means for insulating at least part of a body of the sub. The insulating means may comprise inner and outer insulating tubes adapted to be mounted inside and around the sub.

According to a fourth aspect of the present invention, there is provided a method of electrically insulating a first electrically conductive threaded member from a second electrically conductive threaded member of a downhole assembly, the method comprising the steps of:

threadably coupling an electrically insulating device to one of the first and second electrically conductive threaded members; and threadably coupling the electrically insulating device to the other one of the first and second electrically conductive members, to form an electrically insulating coupling between the first and second members.

BRIEF DESCRIPTION OF THE DRAWINGS

There follows a description of embodiments of the present invention, by way of example only, with reference to the accompanying drawings in which.

DETAILED DESCRIPTION OF THE DRAWINGS

Figure 1:
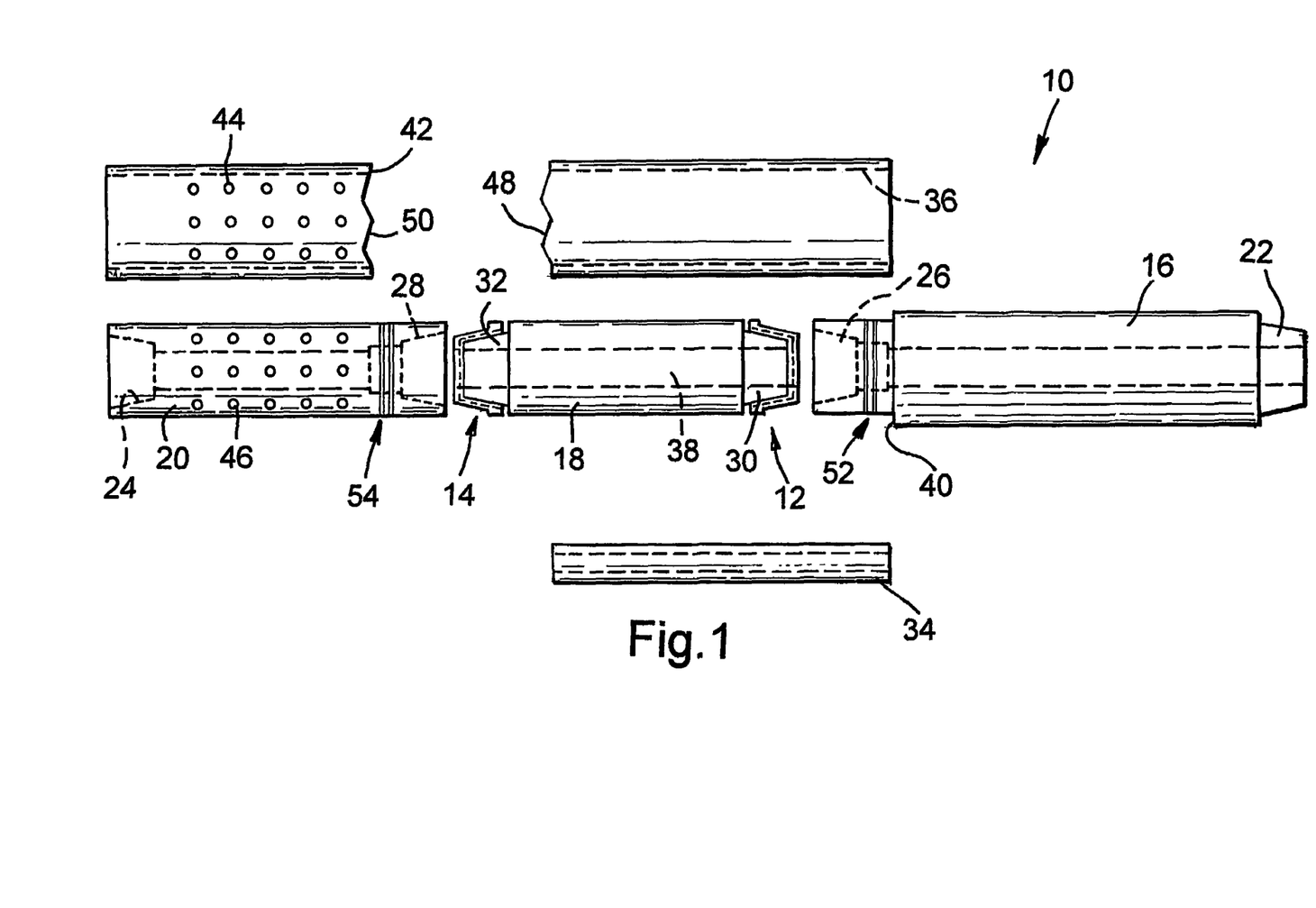
FIG. 1 is a schematic, exploded view of an electrically insulated downhole assembly in accordance with a preferred embodiment of the present invention, including two electrically insulating devices.

Referring firstly to FIG. 1, there is shown, somewhat schematically, an exploded view of an electrically insulated downhole assembly in accordance with a preferred embodiment of the present invention, indicated generally by reference numeral 10. The assembly 10 includes first and second electrically insulating devices in the form of insulating sleeves 12 and 14, which are shown in more detail in FIGS. 2A-2C and will be described below.

The assembly 10 forms part of a MWD/LWD assembly, and is run on lengths of drill tubing in a fashion known in the art. Generally speaking, the assembly 10 includes a first member in the form of an anchor sub 16, a second member in the form of an insulated sub 18, and a third member in the form of a sleeve sub 20. All the parts of the assembly 10 are ideally of non-magnetic materials, to prevent interference with sensitive downhole sensors forming part of the MWD/LWD package. A preferred material is MONEL (Trade Mark), a non-magnetic stainless steel, or Beryllium Copper (BeCu); however, MONEL is preferred for cost reasons. The anchor sub 16 and sleeve sub 20 carry respective tapered threaded API pin and box connections 22, 24, for coupling the assembly 10 to the drill string tubing (not shown). Each of the anchor sub 16, insulated sub 18 and sleeve sub 20 are electrically conductive.

In an EM-MWD system, it is desired to insulate the anchor sub 16 from the sleeve sub 20. An electromagnetic field is generated by an electrical power source (not shown) electrically coupled to the sleeve sub 20. The field propagates from the sleeve sub 20 to the anchor sub 16 and through the earth formation, in a fashion known in the art. The insulated sub 18 is of a length suited to the drilling fluid and prevents short-circuiting between the sleeve sub 20 and the anchor sub 16 through the drilling fluid. In air/foam drilling, the sub 18 may be shorter than when using conventional drilling muds which are comparatively more conductive.

The anchor sub 16 and sleeve sub 20 include tapered box joints 26, 28, whilst the sub 18 is double pin-ended, having pin joints 30 and 32. The insulating sleeves 12 and 14 are threaded onto the respective pin joints 30, 32. The assembly 10 also includes insulating means in the form of inner and outer fibre-glass tubes 34 and 36. The inner tube 34 is located within the bore 38 of the sub 18, whilst the outer tube 36 surrounds the sub 18, and is received between a shoulder 40 on anchor sub 16 and an outer sleeve 42 which is coupled to the sleeve sub 20 by cap-head screws (not shown). These cap-head screws are threaded through aligned locating apertures 44 and 46 in the outer sleeve 42 and sleeve sub 20. Heads of the screws bridge the apertures 44, 46 to provide secure engagement. Adjacent ends of the outer tube 36 and outer sleeve 42 have a matching profile 48, 50, which secures the outer tube 36 against rotation.

Also, o-rings 52 and 54 on the anchor sub 16 and sleeve sub 20 seal the outer insulator tube 36, to prevent fluid flow along the insulated sub 18 beneath the outer tube 36, which would short-circuit the sub.

The insulating sleeves 12 and 14, and their relationship with the anchor sub 16, insulated sub 18 and sleeve sub 20 will now be described in more detail.

Figure 2A:
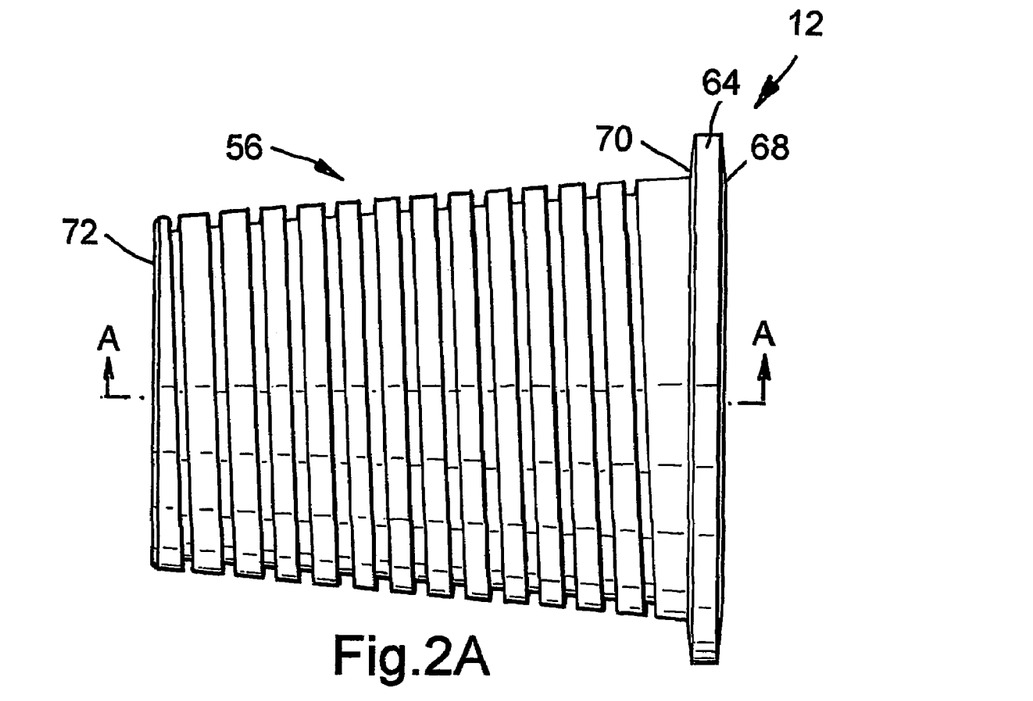
FIG. 2A is an enlarged view of the electrically insulating device of FIG. 1.
Figure 2B:
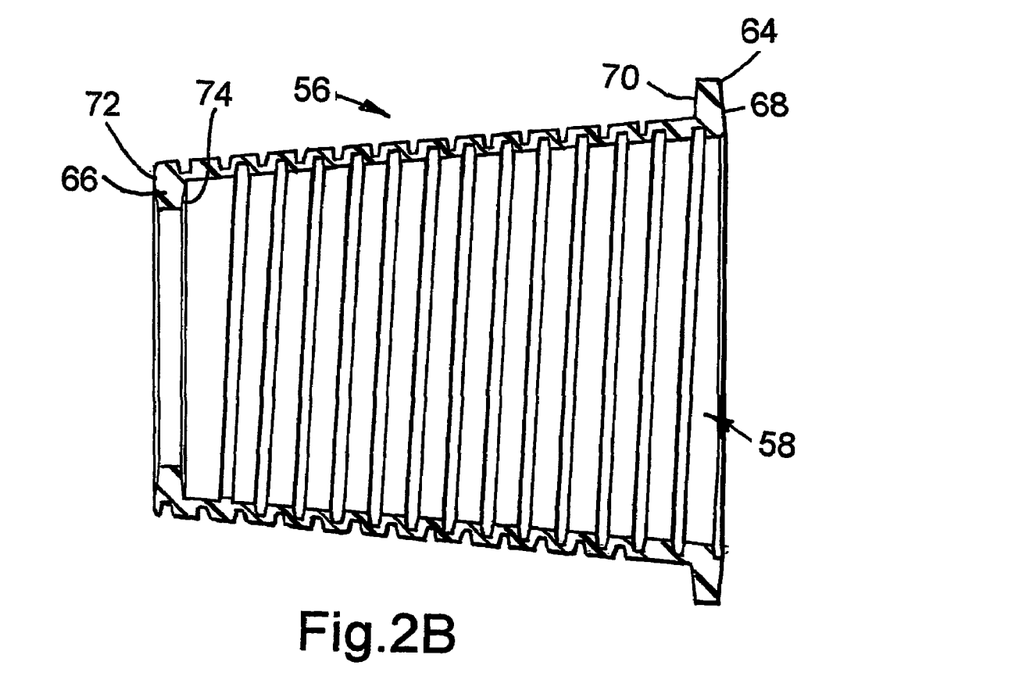
FIG. 2B is a longitudinal cross-sectional view of the electrically insulating device shown in FIG. 2A.

In FIG. 2A, there is shown an enlarged view of the electrically insulating sleeve 12. The sleeve 14 is of a similar configuration. FIG. 2B is a longitudinal cross-section view of the insulating sleeve 12 of FIG. 2A, and shows the internal thread profile. The sleeve 12 is of general thickness of around 5 mm, and has a first, outer thread 56 and a second, inner thread 58, these threads corresponding to threads on the electrically conductive anchor sub 16 and insulating sub 18. The thread profile is shown in more detail in the enlarged view of FIG. 2C, and it will be noted that the outer and inner threads 56, 58 are of similar profile. In this embodiment, the threads are generally of box-section where the angle between the thread flanks 60, 62 is 10°, such that each thread flank is at an angle of 5° with respect to a normal to the thread axis X. The thread is tapered at a ratio of 1 in 12 (4.7636°), the thread pitch is 12 mm, and the thread depth from crest to root is 4 mm.

Figure 2C:
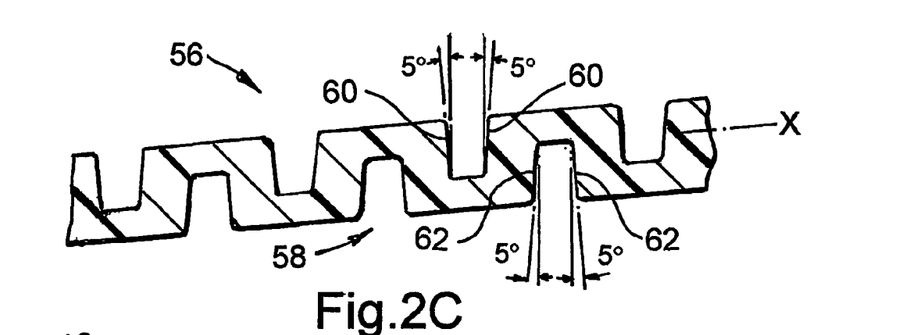
FIG. 2C is an enlarged view of part of the thread profile of the electrically insulating device shown in FIG. 2B.

Use of a generally box-section thread is particularly advantageous in that this ensures the insulating sleeve 12 is largely under compression when the assembly 10 is made up. Also, the sleeve 12 consists of a modified PEEK material, typically TECAPEEK GF30, which exhibits material properties similar to many steels, especially under compressive loading.

The sleeve 12 also carries shoulders 64 and 66 (FIGS. 2A/2B) at either end thereof. The shoulder 64 includes faces 68, 70 which are angled at 5° with respect to a radius A of the sleeve 12. In a similar fashion, the shoulder 66 includes faces 72 and 74 which are angled at 5° with respect to the radius A.

Figure 3A:
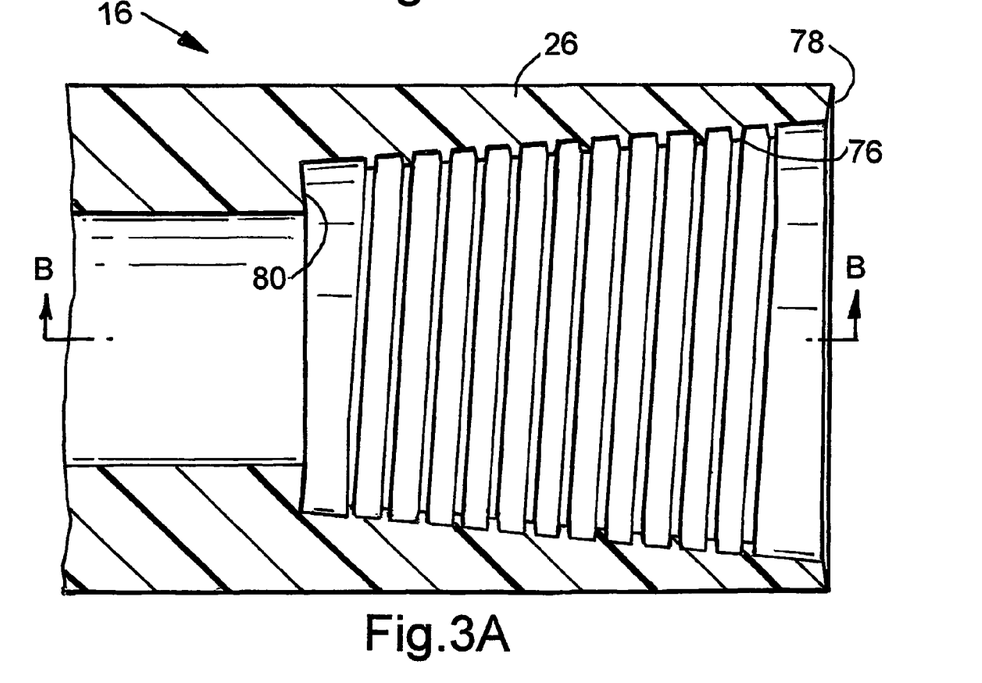
FIG. 3A is an enlarged longitudinal cross-sectional view of a box joint of a first member forming part of the downhole assembly shown in FIG. 1.
Figure 3B:
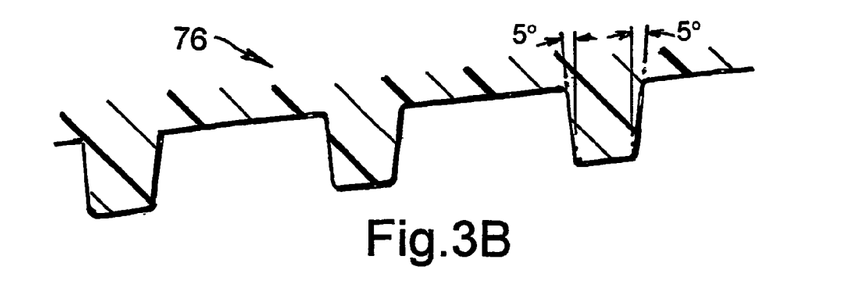
FIG. 3B is an enlarged view of the thread profile of the box joint of FIG. 3A.

FIG. 3A shows the box joint 26 on the anchor sub 16 in enlarged detail. The joint 26 carries a thread 76, which corresponds to the outer thread 56 of the insulating sleeve 12. The thread profile is shown in the enlarged view of FIG. 3B, and it will be noted that the thread 76 is of opposite profile to the outer thread 56 on the sleeve 12, to cooperate with and engage the sleeve. Also, a shoulder face 78 on the sub 16 is angled at 5° with respect to a radius B of the anchor sub 16 (FIG. 3A), and is inclined towards the insulating sleeve 12. A second shoulder face 80 is also provided at an angle of 5° to the radius B and similarly inclined to the insulating sleeve 12.

Thus, when the insulating sleeve 12 is threaded into the box 26, shoulder faces 78 and 80 of the anchor sub 16 abut the corresponding faces 70 and 72 of the sleeve 12.

Figure 4A:
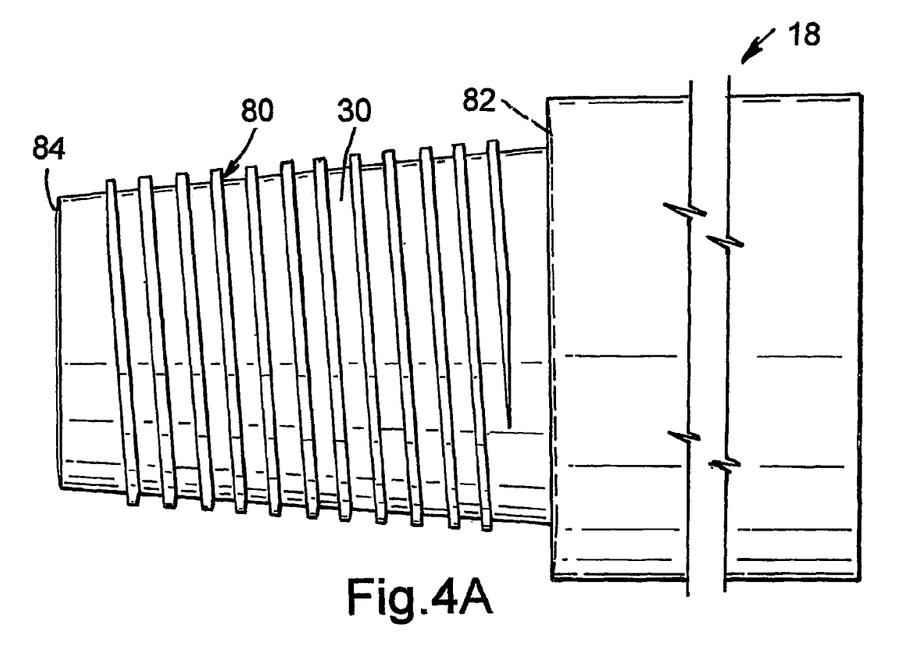
FIG. 4A is an enlarged view of a pin joint of a second member forming part of the downhole assembly shown in FIG. 1.
Figure 4B:
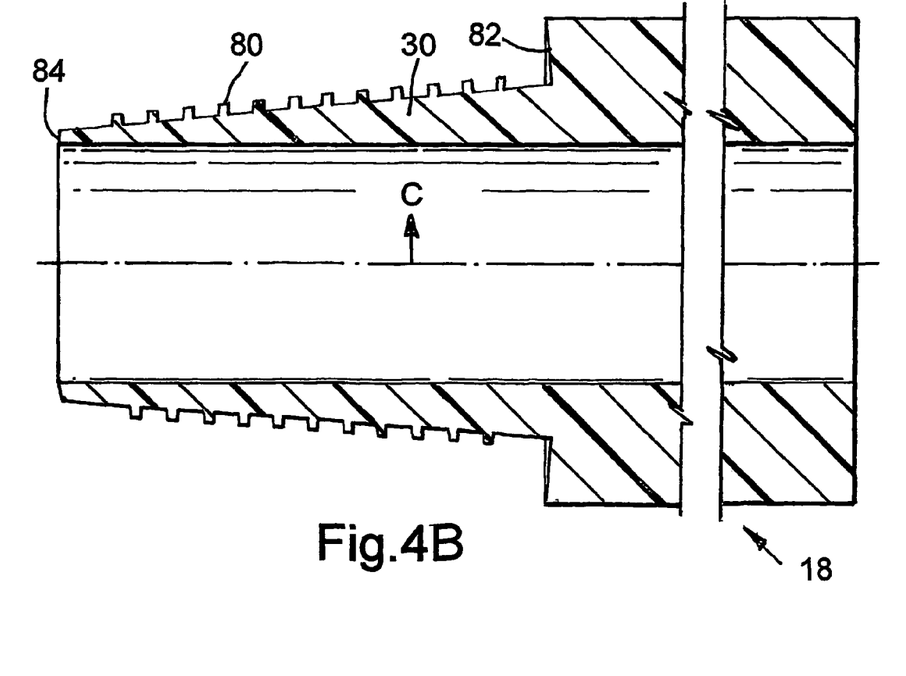
FIG. 4B is a longitudinal cross-sectional view of the electrically insulating device shown in FIG. 4A.
Figure 4C:
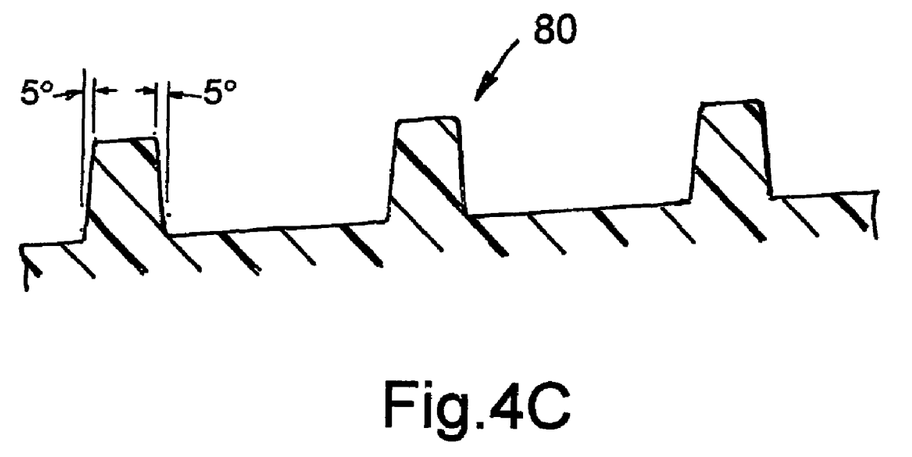
FIG. 4C is an enlarged view of part of the thread profile of the pin joint of FIG. 4A.

Referring to FIGS. 4A to 4C, FIG. 4A shows the male pin 30 on the insulated sub 18, whilst FIG. 4B is a longitudinal cross-sectional view. The male pin 30 carries a thread 80 which corresponds to the inner thread 58 of the insulating sleeve 12. The thread 80 is shown in the enlarged view of FIG. 4C, and is of similar profile to the thread 76 of box 26. Shoulder faces 82 and 84 are angled at 5° with respect to a radius C of the insulated sub 18, and inclined towards the insulating sleeve 12. In this fashion, when the insulating sleeve is threaded onto the pin 30, the shoulder faces 82 and 84 on the insulated sub 18 abut the corresponding faces 68 and 74 on the insulating sleeve 12.

It is the provision of the shoulder faces 78, 80 and 82, 84 on the anchor sub 16 and insulated sub 18 which compress the insulating sleeve 12 when the assembly 10 is torqued-up to a desired mating force.

It will be understood that the insulating sleeve 14 is of identical design to the sleeve 12, and mates with the box 28 of sleeve sub 20 and pin 32 of insulated sub 18 in an identical fashion.

The assembly 10 is typically made-up by threading the first insulating sleeve 12 onto the pin 30 of insulated sub 18 and the second insulating sleeve 14 onto the pin 32. The pin 30 and sleeve 12 are then mated with the box 26 and torqued-up. The inner insulator 34 is then located within the bore 38, and the outer insulator tube 36 located around the insulated sub 18, abutting the shoulder 40 on anchor sub 16. The sleeve sub 20 is then mated with the pin 32 and insulating sleeve 14 and torqued-up, before the outer sleeve 42 is located over the sleeve sub 20, mating the profile 50 with profile 48 on outer tube 36. The cap-head screws are then located in the aligned apertures 44, 46, to lock the sleeve 42 and outer tube 36 in place. The assembly 10 is then ready to be mated with tubing of the drill string. Also, the pitch, taper, depth and profile of the threads 56, 58 on the sleeves 12, 14 are such that there is an overlap between the threads 76 on the anchor sub 16 and the threads 80 on the insulated sub 18; and the threads on the sleeve sub 20 and the insulated sub 18, respectively. This is advantageous in that, in the unlikely event of failure of either one of the insulating sleeves 12 or 14, the overlap between the threads of these components ensures that there is no separation of the parts.

Various modifications may be made to the foregoing within the scope of the present invention. For example, the electrically insulating sleeve may be employed in any downhole or other situation where it is desired to provide an electrically insulated joint. The threads on the electrically insulating sleeves may be of any desired, alternative profile, and the sleeves may of any alternative plastics or composite materials which are electrically insulating. Equally, the inner and outer insulating tubes may of any such alternative materials. The second member may comprise box joints at either end thereof, or a pin joint at one end and a box joint at the other end thereof; the first and third members may therefore carry appropriate pin/box joints for coupling with the box/pin joints on the second member. In situations where the MWD/LWD package does not include sensors which are sensitive to magnetic fluctuations, alternative materials may be used for parts of the downhole assembly, such as typical, magnetic steels used in the downhole environment.

The invention claim is:

1. An electrically insulating sleeve for a downhole tool for electrically insulating a first threaded electrically conductive member from a second threaded electrically conductive member, the insulating sleeve having inner and outer surfaces defining respective first and second threads corresponding to the threads on the first and second electrically conductive members, respectively, for coupling the first and second electrically conductive members together, and the sleeve being shaped such that on coupling the first and second members together, longitudinally adjacent thread turns on said first and second members overlap in a radial direction, wherein the first and second threads of the insulating sleeve are generally box shaped in cross-section, and wherein the sleeve comprises a tapered sleeve including shoulders at opposite ends thereof, each shoulder adapted to abut the first and second members in use, and each shoulder further comprises first and second faces, each of the first and second faces disposed at an oblique angle with respect to a radius of the sleeve.

2. A sleeve as claimed in claim 1, wherein the thread flanks are substantially perpendicular to the thread axis.

3. A sleeve as claimed in claim 1, wherein the thread angle between the thread flanks is within the range 0 degrees to 10 degrees.

4. An electrically insulated downhole assembly comprising:
   first, second and third threaded electrically conductive members adapted to be coupled together; and
   an electrically insulating assembly including a first electrically insulating sleeve having inner and outer surfaces defining respective first and second threads corresponding to the threads on the first and second electrically conductive members, for coupling the first and second electrically conductive members together to electrically insulate the first threaded member from the third threaded member, the sleeve being shaped such that on coupling said first and second members together, longitudinally adjacent thread turns on said first and second members overlap in a radial direction, and further comprising insulating means for insulating part of the second member to prevent short circuiting between the second member and the first and third members, wherein the first and second members include shoulders having faces disposed at an oblique angle with respect to respective radii of the first and second members to exert a compressive force upon the sleeve, in use.

5. An assembly as claimed in claim 4, wherein the insulating means comprises inner and outer insulating tubes mounted inside and around the second member, respectively.

6. An assembly as claimed in claim 4, wherein the insulating means comprises an insulating coating applied to at least part of the inner and outer surfaces of the second member.

7. An electrically insulating sleeve for a downhole tool for electrically insulating a first threaded electrically conductive member from a second threaded electrically conductive member, the insulating sleeve having inner and outer surfaces defining respective first and second threads corresponding to the threads on the first and second electrically conductive members, respectively, for coupling the first and second electrically conductive members together, and the sleeve being shaped such that on coupling the first and second members together, longitudinally adjacent thread turns on said first and second members overlap in a radial direction,
   wherein the sleeve comprises a tapered sleeve including shoulders at opposite ends thereof, each shoulder adapted to abut the first and second members in use, and
   wherein each shoulder further comprises first and second faces, each of the first and second faces disposed at an oblique angle with respect to a radius of the sleeve.

8. A sleeve as claimed in claim 7, wherein the sleeve is for an electromagnetic measurement while drilling downhole tool.

9. A sleeve as claimed in claim 7, wherein the sleeve is of a plastics material.

10. A sleeve as claimed in claim 9, wherein the sleeve is of a modified Polyetheretherketone (PEEK).

11. An electrically insulated downhole assembly comprising:
    first, second and third threaded electrically conductive members adapted to be coupled together; and
    an electrically insulating assembly including a first electrically insulating sleeve having inner and outer surfaces defining respective first and second threads corresponding to the threads on the first and second electrically conductive members, for coupling the first and second electrically conductive members together to electrically insulate the first threaded member from the third threaded member, the sleeve being shaped such that on coupling said first and second members together, longitudinally adjacent thread turns on said first and second members overlap in a radial direction,
    wherein the first and second members include shoulders having faces disposed at an oblique angle with respect to respective radii of the first and second members to exert a compressive force upon the sleeve, in use.

12. An assembly as claimed in claim 11, further comprising a second electrically insulating sleeve having inner and outer surfaces defining respective first and second threads corresponding to the threads on the third and second members, for coupling the second and third electrically conductive members together, the sleeve being shaped such that on coupling said second and third members together, longitudinally adjacent thread turns on the second and third members overlap in a radial direction.

13. An assembly as claimed in claim 11, wherein the assembly is adapted to be run as part of an electromagnetic measurement while drilling tool.

14. An assembly as claimed in claim 11, wherein the first and third members comprise coupling subs for coupling the assembly to a length of tubing.

15. An assembly as claimed in claim 11, wherein the first and third members form part of a tubing string.

16. An assembly as claimed in claim 11, wherein the second member comprises a double pin ended sub for coupling the first and third members together.

17. An assembly as claimed in claim 12, wherein the third member includes a shoulder having a face and the faces of the shoulders on the first and third members are inclined towards the first and second sleeves, in use.

18. An assembly as claimed in claim 17, wherein the faces are angled with respect to respective radii of the first and third members.

19. An assembly as claimed in claim 17, wherein the first and second sleeves include shoulders having cooperating angled faces.

20. An assembly as claimed in claim 12, wherein the first and second sleeves include shoulders having cooperating angled faces.

* * * * *